Oct. 25, 1955 R. J. ATTI 2,721,503
ENGRAVING MACHINES
Filed Jan. 22, 1953 3 Sheets-Sheet 1
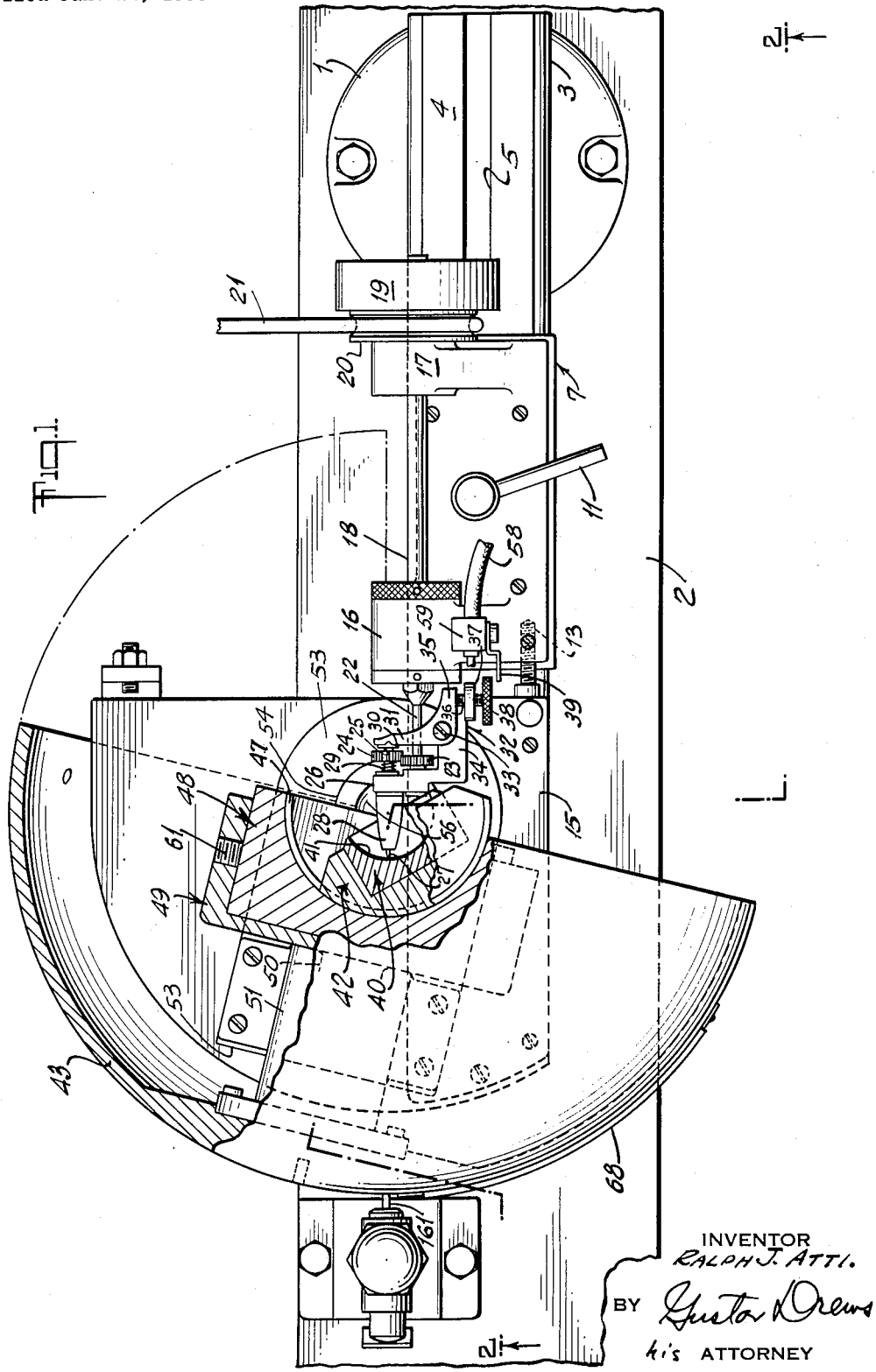
INVENTOR
RALPH J. ATTI.
BY Gustav Drews
his ATTORNEY Oct. 25, 1955
R. J. ATTI
2,721,503
ENGRAVING MACHINES
Filed Jan. 22, 1953
3 Sheets-Sheet 2
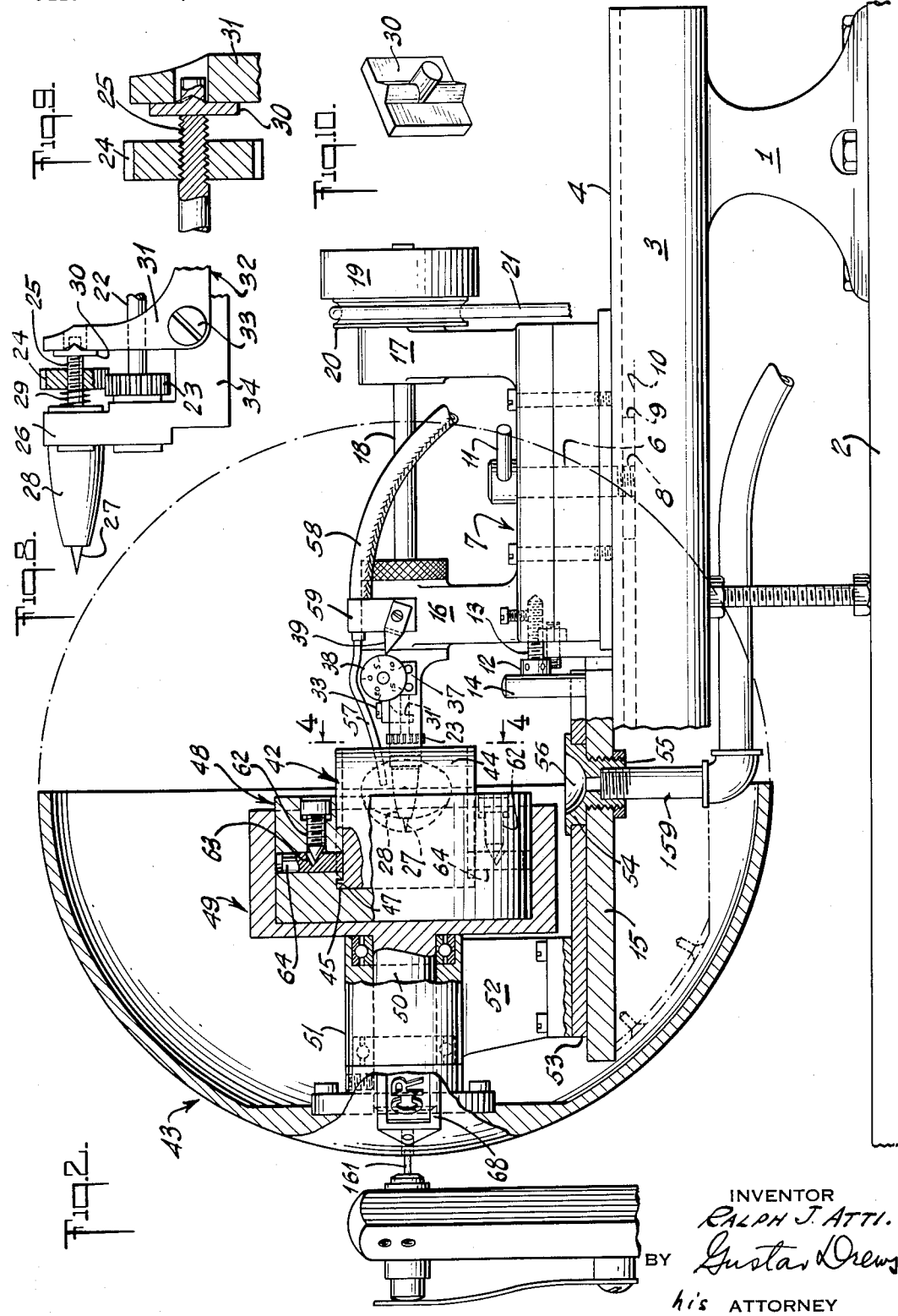
INVENTOR
RALPH J. ATTI.
BY Gustav Drews
his ATTORNEY Oct. 25, 1955    R. J. ATTI    2,721,503
ENGRAVING MACHINES
Filed Jan. 22, 1953    3 Sheets-Sheet 3
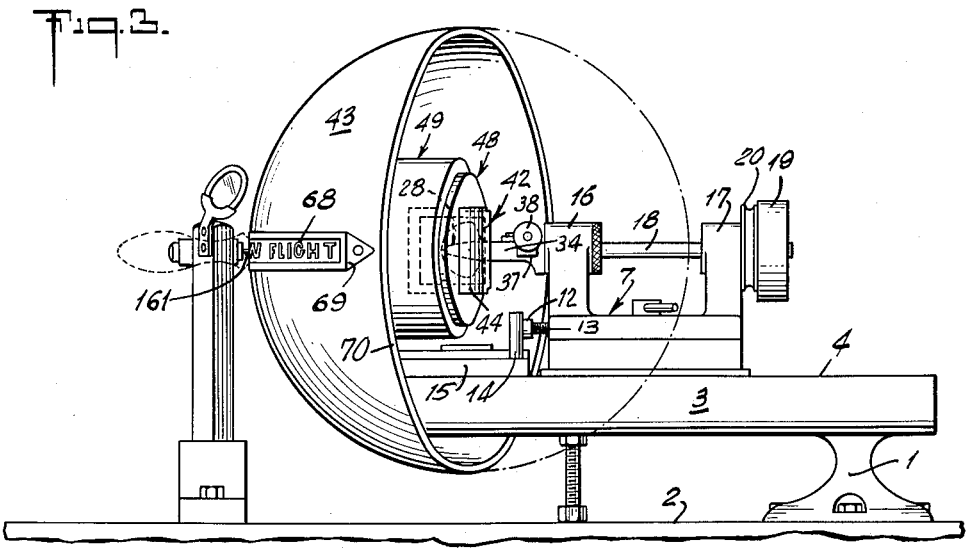
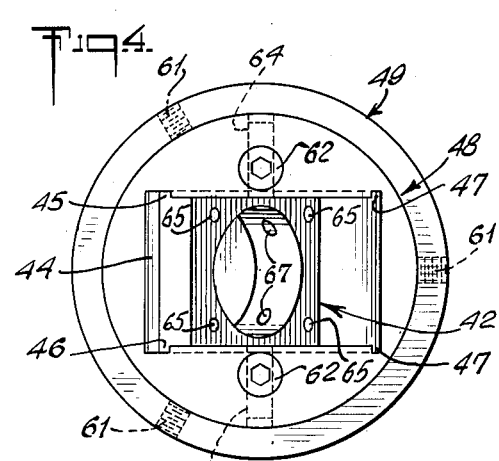
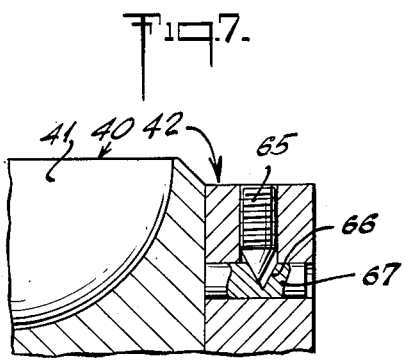
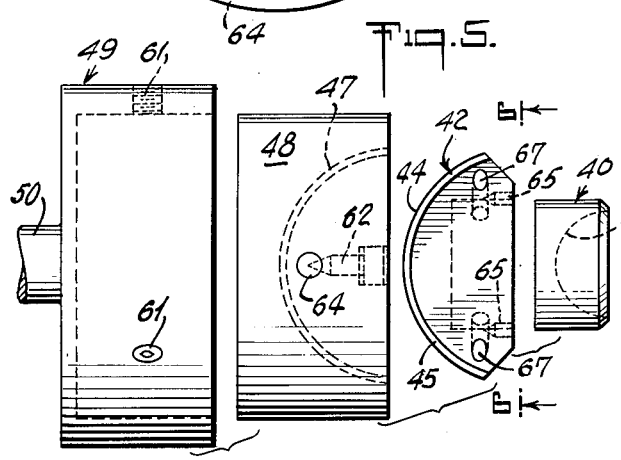
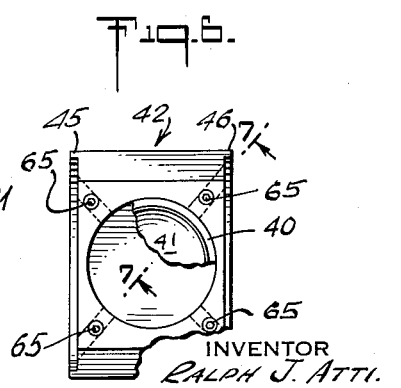
INVENTOR
RALPH J. ATTI.
BY Gustav Drews
his ATTORNEY United States Patent Office 2,721,503
Patented Oct. 25, 1955

2,721,503
ENGRAVING MACHINES
Ralph J. Atti, Cliffside Park, N. J.
Application January 22, 1953, Serial No. 332,646
5 Claims. (Cl. 90—13.3)

This invention relates to engraving machines and particularly to machines for cutting indicia into semi-spherical mold faces such as the faces of cups of golf ball molds.

Among the objects of the present invention, it is aimed to provide an improved engraving machine for cutting indicia into semi-spherical molds in which the machine having a master is characterized by enabling the master to be manipulated with a minimum amount of movement in the interest of reducing the physical effort on the part of the operator to manipulate the master not only to reduce the wear and tear on the operator, but also to facilitate expediting the cutting operation and thereby to reduce the cost of production.

More specifically, it is an object of the present invention to provide an engraving machine including a cutting tool, a master having a spherical convex face guided by a stylus and a work holder secured to said master and supporting the work piece with a spherical concave face positioned inwardly of and concentric to the convex face of the master but with the pole of the concave face off center relative to the pole of the concave face of the master so that indicia may be cut across, or adjacent to, the pole of the concave face of the work piece with a minimum amount of movement on the part of the master.

These and other features, capabilities and advantages of the present invention will appear from the subjoined detailed description of one specific embodiment thereof illustrated in the accompanying drawings, in which Fig. 1 is a plan view partly in section of a machine made according to the present invention.

Fig. 2 is a section partly broken away on the line 2—2 of Fig. 1.

Fig. 3 is a side elevation on a smaller scale than that of Fig. 2.

Fig. 4 is a section on the line 4—4 of Fig. 2.

Fig. 5 is an exploded view of the several parts of the work holder and the work piece or cup separated from one another.

Fig. 6 is an end view on the line 6—6 of Fig. 5.

Fig. 7 is a section on the line 7—7 of Fig. 6.

Fig. 8 is a side view enlarged partly broken away showing the cutting tool and holder.

Fig. 9 is a section still further enlarged of the holder and cutting tool shown in Fig. 8.

Fig. 10 is a perspective of a portion of the cutting tool holder shown in Fig. 9.

The present machine is similar in some respects to the machine disclosed in co-pending application Serial No. 324,080, filed December 4, 1952, having a pedestal 1 supported on a bench 2, which pedestal 1 in turn has extending horizontally therefrom the arm 3 having the bed 4 provided with a longitudinally extending opening 5 to receive the shank 6 in the bracket 7 which may be anchored in position along the bed 4 by the cooperation of the threaded portion 8 of the shank 6 with the plate 9 in the channel 10 formed in the arm 3 when the shank 6 is turned by the handle 11. The forward or operative position of the bracket 7 is preferably limited by the stop head 12 of the screw 13 on the bracket 7 engaging the lug 14 on the platform 15 secured to the upper face of the arm 3.

The bracket 7, in turn, has two uprights 16 and 17 forming journals for the shaft 18. On the rear end of the shaft 18 there is fixed the fly wheel 19 adjacent to the pulley 20 which is connected by the belt 21 to a suitable drive pulley, not shown.

On the front end of the shaft 18 is secured the small shaft 22 extending forwardly of the upright 16, which shaft 22 in turn has fixed on its front end the gear 23 in mesh with the gear 24 mounted on the shaft 25 which extends through the bearing 26 and formed at its front end into the cutting tool 27 which is mounted in the conical extension 28 of the bearing 26. The shaft 25 with the cutting tool 27 is slidably mounted in the bearing 26 and has mounted thereon the spring 29 disposed between the gear 24 and the rear face of the bearing 26 yieldably to maintain the shaft 25 in a rearward position and with its rear end in engagement with the plate 30 floatingly mounted in the arm 31 of the L-shaped bracket 32 pivotally mounted at 33 on the forward extension 34 of the bracket 7. The rearwardly extending arm 35 of the L-shaped bracket 32 engages the free end of the screw 36 screw threadedly connected to the bearing 37 on the extension 34, which screw 36 has secured thereto the knurled control disk 38 having graduations on the front face thereof, see Fig. 2, to cooperate with the indicator 39 to determine the position of the cutting tool 27 with regard to the depth of cut to be formed thereby in the work piece 40. The setting of the cutting tool 27 by the mechanism just described is set forth in detail in the aforesaid co-pending application.

The work piece 40 in the present instance is shown, see Fig. 5, as a conventional golf ball mold cup having a concave semi-spherical face 41 preformed before being introduced into the inner work holder portion 42. As disclosed in the aforesaid co-pending application, the shaft 18 is drivingly connected to the belt 21, the bracket 7 then advanced until the stop 12 engages the lug 14 in which position the front end of the cutting tool 27 just clears the concave face 41 without cutting into the same. Thereupon the guide disk 38 is turned according to the depth of cut to be made during which action of the disk 38 the L-shaped bracket 32 will advance the cutter 27 while rotating into the work piece 40. From then on the work piece 40 will be manipulated relative to the cutting tool 27 by the master frame 43 connected to the work holder portion 42. The work holder portion 42, see Fig. 5, has a cylindrical outer face 44 terminating in arcuate ribs 45 and 46 which are slidably mounted in arcuate channels 47 formed in the second work piece portion 48 which is cylindrical in outline, see Fig. 4, and mounted in the outermost work holder portion 49 integral with the shaft 50 extending forwardly and fixedly connected to the frame 43. The shaft 50 with the frame 43 is journalled in the bearing 51 formed at the upper end of the extension 52 extending upwardly from the plate 53 slidably mounted on the platform 15. The plate 53 in turn is journalled on the disk 54 positioned on the platform 15 and provided with the extension 55 screw threadedly connected to the platform 15. The disk 54 in the present instance is chambered and disk shaped at 56 to receive the oil drippings fed to the cutting tool 27 through the conduit 57 connected to the conduit 58 which in turn is connected to an oil supply, not shown, the conduits 57 and 58 being fixed to the upright 16 by the bracket element 59. As the oil fed to the cutting tool 27 drips down into the dish-shaped opening 56, it will in turn drip down through the conduit 159 to be returned to the oil supply or other receptacle, not shown. It will thus be seen that the frame 43 with the work holder elements 49, 48 and 42, together with the work piece 40 may all simultaneously be rotated relative to the journal 51 mounted on the plate 53, and that the plate 53 with the frame 43, work holders 49, 48 and 42 and work piece 40 may in turn be rotated about the platform 15 on the journal provided by the disk 54. The outer face of the frame 43 is ordinarily provided with any suitable design in depressed or raised letters, which design is generally formed on a plate secured to the outer face of the frame 43. This plate 68, or the depressions therein, will be engaged by the stylus 161 and the operator moves the frame 43 as the work progresses so that the design on such plate will be transmitted to the work piece 40 to permit the cutting tool 27 to cut the design desired.

The mechanism so far described does not depart materially from the disclosure in the aforesaid co-pending application. The parts now to be described constitute the main part of the present invention, which however are particularly adapted for use with the mechanism so far described.

In the cutting of a golf ball mold cup, after the concave face 41 has been cut into the work piece 40, the work piece 40, if it is a golf ball mold cup, may then have the extensive surface design cut into the same consisting either of the conventional dimple design or the conventional mesh design, or any other design. After this extensive surface design has been cut into the concave face 41, there is generally left an uncut portion at the pole of the cup to receive a distinctive design. Since these distinctive designs are frequently the name of the ball, such as "Kroflite," or the like, these names are generally arranged in an elongated panel. If such elongated panel extended across the pole of the frame 43, and the pole of the cup 40 was concentric to the pole of the frame 43, the operator when cutting the design at the pole or near the pole would be required to move the frame 43 a much greater distance in order to cover the entire name plate than would be required if the name plate were formed on the frame 43 nearer its outer edge. In other words, for a dimple at the outer edge of the frame 43, when the pole of the cup 40 is concentric to the pole of the frame 43, the frame 43 would only be required to move up and down and back and forth a distance equal to the diameter of the particular dimple, and in turn the nearer the dimple is positioned to the pole of the frame 43, the greater the distance that the frame 43 must be moved by the operator in order to transmit this motion to the cup 40 relative to the cutter 27. Finally, if a dimple were formed at the very pole of the frame 43, and the pole of the cup 40 was concentric to the pole of the frame 43, the operator would actually be required to move the frame 43 360° relative to the horizontal axis, and 180° about the vertical axis of the frame 43. Obviously this calls for a great deal of physical effort on the part of the operator and is time consuming. With this in mind, one of the objects of the present invention is to reduce the amount of movement of the frame 43 for the cutting of a distinctive design and thereby to reduce the expenditure of physical energy on the part of the operator, and in turn to reduce the time required for cutting the name plate, not overlooking the saving in wear and tear on the machine in reducing the amount of movement required, particularly when consideration is taken of the fact that these engraving machines in busy times will be operated for periods of twelve or more hours a day.

With the foregoing in mind, in order to take advantage of the reduced amount of movement required, the design is disposed to one side of the pole of the frame 43, and when practicable the design is formed as near to the outer edge of the frame 43 as practicable, and bearing in mind that distinctive markings such as name plates are generally located at the poles of golf balls, the present invention has provided a work holder which will support the work piece or golf ball mold cup 40 with its pole eccentric to the pole of the frame 43 while maintaining the center of the concave face 41 of the cup coincident to the center of the convex face of the frame 43. For this reason, see Fig. 4, the outermost work holder portion 49 has a cylindrical inner face to receive the cylindrical outer face of the intermediate work holder portion 48, which work holder portion 48 after having been positioned, may be anchored to the outermost work portion 49 by any suitable means such as one or more set screws 61, which extend through the cylindrical wall of the work holder portion 49 and engage the outer face of the intermediate work holder portion 48. In turn, the inner work holder portion 42 after having been positioned may then be anchored by the set screws 62, see Fig. 2, passing from the rear face of the work holder 48 into engagement with the tapered slots 63 formed in the pins 64 which when engaged by the set screws 62 will press the pins 64 into frictional engagement with the outer flat faces of the innermost work holder 42. The cup 40 after having been positioned in the inner work holder portion 42 may be anchored by any suitable means, such as one or more set screws 65, see Fig. 7, engaging the tapered slots 66 in the pins 67 extending into engagement with the outer cylindrical face of the cup 40, the set screws 65 extending in from the rear face of the innermost work holder 42. The adjustment of the position of the work holder portions 48 and 42 relative to the holder portion 49 is provided to facilitate the ultimate positioning of the cup 40 in the work holder 42. However, the innermost work holder 42 alone will be depended upon to position the pole of the cup 40 eccentric to the pole of the frame 43. The work holder 42 will of course be positioned so that the pole of the cup 40 will be positioned approximately concentric with the middle of the name plate design plate 68 positioned on the frame 43. As shown in Fig. 3, the name plate design plate 68 will so be positioned on the outer convex face of the frame 43 that its end 69 will be located as near as possible to the outer face 70 of the frame 43.

This name plate design plate 68 then will alone be positioned on the outer convex face of the frame 43 in place of the extensive surface guiding design plate such as a dimple forming design plate or a mesh forming design plate.

It is obvious that various changes and modifications may be made to the details of construction without departing from the general spirit of the invention as set forth in the appended claims.

I claim:

1. In an engraving machine having a rotatable cutting tool for cutting indicia across the pole of the concave face of a golf ball mold cup, the combination for supporting the cup to be cut in operative relationship to the cutting tool with a minimum amount of movement of the cup during the cutting operation and with the axis of the cutting tool intersecting the imaginary center of the concave face of the cup to be cut, characterized by a main frame on which the cutting tool is rotatably mounted, a second frame rotatably mounted on said main frame to rotate about a vertical axis, a design master having an outer convex face concentric to the concave face of the cup to be cut and rotatably mounted on said second frame to rotate about a horizontal axis, a work holder fixedly mounted adjacent the center of said design master, a cup supporting member, and means supporting said cup supporting member and rotatably mounted in said work holder in turn to enable said cup supporting member to be adjusted in an angular direction about an axis at right angles to the horizontal axis of said design master.

2. The combination as set forth in claim 1 in which the cup supporting member is rotatably mounted in said supporting means to enable said cup supporting member to be adjusted in an angular direction about the horizontal axis of said design master.

3. In an engraving machine having a rotatable cutting tool for cutting indicia across the pole of the concave face of a golf ball mold cup, the combination for supporting the cup to be cut in operative relationship to the cutting tool with a minimum amount of movement of the cup and with the axis of the cutting tool intersecting the imaginary center of the concave face of the cup, characterized by a main frame, a second frame rotatably mounted on said main frame to rotate about a vertical axis, a design master having an outer convex design face concentric to the concave face of the cup to be cut and rotatably mounted on said second frame to rotate about a horizontal axis, an outer chambered member fixed adjacent the center of said design master, an intermediate chambered member mounted in said outer chambered member between the center of said design master and said outer chambered member adjustably in an angular direction about the horizontal axis of said design master, and a cup supporting member mounted in said intermediate chambered member between the center of said design master and said intermediate chambered member adjustably in an angular direction about an axis extending at right angles to the horizontal axis of said design master, whereby the design for the indicia may be disposed on the concave face of the design master to one side of the pole of the design master and the pole of the cup be centered relative to said indicia design and eccentric to the pole of the design master.

4. In an engraving machine having a rotatable cutting tool for cutting indicia in the concave face across the pole of a golf ball mold cup, the combination for supporting the cup to be cut in operative relationship to the cutting tool with a minimum amount of movement of the cup and with the axis of the cutting tool intersecting the geometric center of the cup to be cut, characterized by a main frame, a second frame rotatably mounted on said main frame to rotate about a vertical axis relative to the cutting tool, a design master having an outer convex design face concentric to the concave face of the cup to be cut adapted to be engaged by a stylus and rotatably mounted on said second frame to rotate about a horizontal axis relative to the cutting tool, a work holder fixed in said design master, a cup supporting member, and means supporting said cup supporting member and rotatably mounted in said work holder in turn to enable said cup supporting member to be adjusted in an angular direction about an axis at right angles to the horizontal axis of said design master, whereby the design for the indicia may be disposed on the concave face of the design master to one side of the pole of the design master and the pole of the cup be centered relative to said indicia design and eccentric to the pole of the design master.

5. The combination as set forth in claim 4 in which the cup supporting member is rotatably mounted in said supporting means to enable said cup supporting member to be adjusted in an angular direction about the horizontal axis of said design master.

References Cited in the file of this patent

UNITED STATES PATENTS 2,058,395    Atti _____ Oct. 27, 1936